United States Patent [19]

Showak

[11] Patent Number: 4,606,869
[45] Date of Patent: Aug. 19, 1986

[54] METHOD OF MAKING AIR ATOMIZED SPHERICAL ZINC POWDER

[75] Inventor: Walter Showak, Palmerton, Pa.

[73] Assignee: The New Jersey Zinc Company, Palmerton, Pa.

[21] Appl. No.: 644,635

[22] Filed: Aug. 27, 1984

[51] Int. Cl.⁴ .................................................. B29B 9/10
[52] U.S. Cl. ........................................ 264/12; 264/15; 420/513
[58] Field of Search ........................... 75/0.5 C, 0.5 B; 420/513; 264/12, 15

[56] References Cited

U.S. PATENT DOCUMENTS

| | | | |
|---|---|---|---|
| 1,869,496 | 8/1932 | Osborg | 420/513 |
| 2,255,204 | 9/1941 | Best | 75/0.5 |
| 2,849,309 | 8/1958 | Wlaley | 75/0.5 B |
| 3,041,672 | 7/1962 | Lyle | 264/10 |
| 3,293,334 | 12/1966 | Bylund et al. | 264/12 |
| 3,340,566 | 9/1967 | Woosley et al. | 425/7 |
| 3,430,289 | 3/1969 | Aikawa et al. | 425/6 |
| 3,501,802 | 3/1970 | Ullman et al. | 425/7 |
| 3,527,596 | 9/1970 | Butterfield | 75/0.5 B |
| 3,563,730 | 2/1971 | Bach et al. | 75/0.5 B |
| 3,652,259 | 3/1972 | Knopp | 264/15 |
| 3,768,995 | 10/1973 | Calleja | 75/0.5 B |
| 3,813,196 | 5/1974 | Backstrom et al. | 425/7 |
| 4,047,933 | 9/1977 | Larson et al. | 75/0.5 C |
| 4,389,240 | 6/1983 | Erich et al. | 75/0.5 B |
| 4,390,368 | 6/1983 | Houck | 75/251 |
| 4,432,937 | 2/1974 | Kuwayama et al. | 420/513 |

FOREIGN PATENT DOCUMENTS

| | | | |
|---|---|---|---|
| 0375244 | 5/1923 | Fed. Rep. of Germany | 420/513 |
| 0085349 | 7/1978 | Japan | 420/513 |
| 1026833 | 4/1966 | United Kingdom | 420/513 |
| 1122494 | 8/1968 | United Kingdom | 420/513 |

OTHER PUBLICATIONS

"Deep-Drawing of Zinc and Zinc Alloys", The Metal Industry, F. Erdmann-Jesnitzer et al., pp. 82-84, Feb. 5, 1943.

Primary Examiner—Donald Czaja
Assistant Examiner—MaryLynn Fertig
Attorney, Agent, or Firm—Vincent J. Vasta, Jr.

[57] ABSTRACT

The present invention provides a method for the production of spherically-shaped zinc powders using an atomization process. The method involves an alloying addition of lithium to the molten zinc prior to atomization. The invention also provides for spherically-shaped zinc-lithium, zinc-lithium-lead, and zinc-lithium-lead-indium alloy powders which are produced using the method of the invention.

14 Claims, 2 Drawing Figures

METHOD OF MAKING AIR ATOMIZED SPHERICAL ZINC POWDER

BACKGROUND OF THE INVENTION

Particulate metallic zinc is produced commercially by two methods:
(1) controlled condensation of zinc vapor, and
(2) atomization of molten zinc by impinging a pressurized fluid (generally compressed air) onto a stream of the molten zinc.

The product of the first method, commonly referred to as "zinc dust", is quite small in particle size, almost all passing through a 325 mesh screen (U.S. Standard), is spherical in shape, and contains about 3-5% zinc oxide. The atomized zinc material, commonly referred to as "zinc powder", is larger in particle size, is irregular in particle shape, and typically contains less than 1.5% zinc oxide.

Included among the most important physical properties of particulate metals, more commonly referred to as metal powders, are:
(1) flow rate,
(2) apparent density,
(3) particle shape, and
(4) particle size and size distribution.

These properties are closely related in that the apparent density, that is, the weight of a given volume of loose powder, depends not only on the material density but also on particle shape, size and size distribution. Zinc dusts with their small size, narrow size distribution and spherical shape exhibit apparent densities in the range of 3.0-3.5 g/cc. Zinc powders with their larger size, irregular shape and wider size distribution are also characterized by a low apparent range of 2.7-2.9 g/cc. Thus, the finer, spherical zinc dusts with a narrow size range and the coarser, irregular zinc powders with a broad size range exhibit practically the same apparent densities, neither exceeding about 3.5 g/cc.

Flow rate, that is, the time necessary for a specific weight of powder to flow through an orifice, is also dependent on particle size and shape. Free flow of powder is advantageous for rapid and complete filling of die cavities. Flow rate increases as the particle size increases, and for a given particle size, spherical particles flow faster than irregular particles.

While the particle size of the spherical zinc dust produced by condensation of zinc vapor may be varied to some extent, it nevertheless remains quite small and of narrow distribution. In any case, the generation of the required zinc vapor results in an energy consumption much greater than that of the atomization process wherein it is required that the zinc only be molten. By varying atomizing fluid pressure and molten zinc stream diameter, the particle size of the atomized zinc powder may be varied to a much greater extent than that of the condensed zinc dust. Unfortunately, the irregular particle shape persists.

Thousands of tons of each of these products are consumed each year. The more finely divided zinc dust finds its greatest application in protective coatings. Applications for zinc powders include primary alkaline batteries, friction materials, chemical formulations, mechanical plating, spray galvanizing and others. Up to the present time, only irregular zinc powders have been used in these applications because spherical zinc powders are not commercially available. It is known that the chemical and physical properties of zinc powders vary with particle shape and size. Irregular-shaped particles possess a greater surface area per unit volume, slower flow rate and a lower apparent density compared to spherical-shaped particles of equivalent particle size distribution. Efficient separation of a powder into its various particle size fractions by mechanical screening is more difficult with irregular particles. Thus, the characteristics of spherical zinc powders offer potential advantages in the above-mentioned applications.

For example, powders with spherical shape are commonly used in the fabrication of filters where controlled porosity is obtained through the use of carefully graded particle sizes. Similar control of porosity might be used advantageously in alkaline primary batteries where a more uniform porosity should provide a better distribution of the KOH battery electrolyte, possibly resulting in improved performance.

Air atomized zinc powder has been commercially produced since the early 1940's and various processes are known in the art for the preparation of same. Included amongst the most significant prior art in this area are the followng references:

U.S. Pat. No. 2,255,204 which issued on Sept. 9, 1941 to Best teaches an improved atomized brass powder, the particles of which are rounded and spherical, and which exhibits the characteristics of being both free-flowing and of relative high apparent specific gravity, produced by atomizing molten brass containing from about 0.05 to about 1% of phosphorous.

U.S. Pat. No. 3,041,672 which issued on July 3, 1962 to Lyle teaches a process for producing fine particles of spheroidal shape which utilizes the step of striking an arc between a stick electrode and a nozzle electrode, introducing a consumable wire or rod into the plasma effluent of the arc and passing a gas stream along the plasma to shear off molten material, thereby forming small droplets which are removed from the arc zone and solidified.

U.S. Pat. No. 3,293,334 which issued on Dec. 20, 1966 to Bylund et al. teaches a method of manufacturing fine spherical aluminum powder wherein the molten metal is atomized and the particle formed is initially typically elongated owing to the action of the use of high velocity gas which tears the particle away from the stream of molten metal as it issues from the atomizing nozzle.

This method employs the use of a high velocity stream of exothermic gas containing nitrogen and carbon dioxide to disintegrate the metal into fine particles and to provide available oxygen in an amount insufficient to interfere with surface tension forces of the particles affecting sphere formation and subsequently passing the gas stream along with the particles of molten metal through the spheroidizng zone to cause sphere formation and solidification.

U.S. Pat. No. 3,340,566 which issued on Sept. 12, 1967 to Woosley et al. is directed to an apparatus for the production of metal particles by atomizing the molten metal with an inert gas and subsequent exposure of the atomized metal to an inert gas providing controlled oxidation of the metal surface, and is particularly concerned with the production of spherical aluminum powders.

U.S. Pat. No. 3,420,289 which issued on Mar. 4, 1969 to Aikawa et al. teaches an apparatus for preparing high purity fine powder of low melting metals including zinc and is particularly concerned with the physical arrangement of the apparatus involved.

U.S. Pat. No. 3,501,802 which issued on Mar. 24, 1970 to Ullman et al. also teaches a method and apparatus for producing metal powders in which molten metal is atomized in a tower by a tornado like spiral stream of fluid produced by an atomizing nozzle device.

None of the foregoing teachings is particularly concerned with the improvement provided by the method of the present invention which is directed to the preparation of spherically shaped zinc powders using commercially available atomization techniques which have generally heretofore persisted in producing irregular shaped particles.

It is, therefore, an object of the present invention to provide for a method for the preparation of spherical zinc powder particles using commercially available atomizing techniques.

It is also an object of the present invention to provide for a method for producing spherical zinc powder particles which exhibit a spherical morphology over a wide range of particle sizes.

It is a further object of the present invention to provide for spherically shaped zinc powder particles having improved flow and higher apparent density characteristics as compared with irregular shaped zinc powders produced using conventional air atomizing techniques.

It is yet a further object of the present invention to provide for the production of an atomized spherical zinc powder which exhibits hydrogen gassing characteristics comparable to those of commercially available irregular zinc powders for use in alkaline batteries.

These and other objects of the invention will become apparent from the following description of the invention.

SUMMARY OF THE INVENTION

In accordance with the present invention, a method is provided for the production of spherically-shaped zinc powders using an atomization process. The method involves an alloying addition of lithium to the molten zinc prior to atomization. The invention also provides for spherically-shaped zinc-lithium, zinc-lithium-lead, and zinc-lithium-lead-indium alloy powders which are produced using the method of the invention.

DESCRIPTION OF THE PRESENT INVENTION

Figure 1:
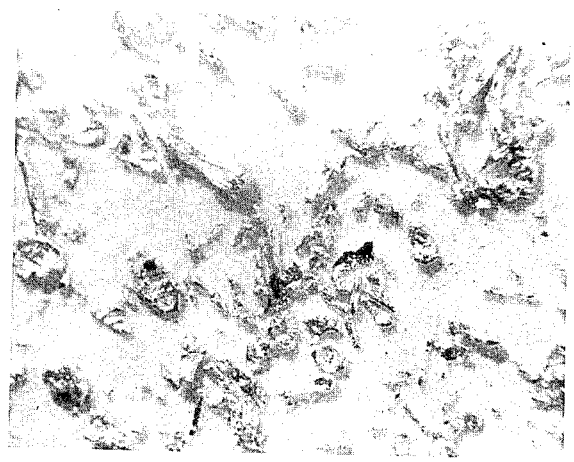
FIG. 1 is a photograph of air-atomized zinc powder, at a magnification of 13×, showing the typical irregular shape demonstrated by all particles over the entire size range.

The method of the present invention includes conventional, commercially-feasible atomizing techniques by which currently available zinc powders are produced. While the composition of such atomized zinc powders may be tailored for specific applications, their particle shape remains consistently irregular. In any case, atomized spherical zinc powder is not presently available commercially.

The method of the present invention provides that prior to atomization, lithium is alloyed with zinc, as for example, by addition of a zinc-4.6 lithium alloy to molten zinc contained in any conventional melting facility (for example, gas-fired crucible, induction furnace, etc.). Since lithium is a reactive metal, holding time must be carefully controlled to reduce loss of lithium.

As indicated previously, conventional commercially-feasible atomizing techniques are entirely satisfactory. The molten zinc-lithium alloy is discharged through an orifice into a stream of compressed air. Control of metal temperature and maintenance of a constant height of molten metal above the orifice insures a steady stream. In general, the larger the metal stream, the greater the pressure and volume of atomizing air required. For any given metal rate, higher air pressure and volume result in finer particle size product. Practical operating parameters include 5–10 kg/min of metal and 50–200 psi of air. In the preparation of the zinc powders in the examples to follow, molten zinc-lithium alloy at 500°–510° C. were poured through a 9/64" (3.6 mm) diameter orifice at the rate of about 5 kg/min. Compressed air at about 60 psi was impinged upon the molten stream. The resultant atomized zinc powders were collected in a stainless steel chamber, screened to remove the oversize and to provide specific screen sizes.

It has now been discovered that if prior to atomization, molten zinc is alloyed with an amount of from about 0.01% by weight of lithium, the resulting atomized zinc powder particles are spherical in shape.

It has been found that from 0.01 to 0.1 weight percent of lithium, based upon the total weight of the zinc alloy composition, is normally effective in providing a spherically shaped powder subsequent to atomization. Preferentially, from 0.01 to 0.05 weight percent of lithium will be utilized.

It has also been found that the particlar method of atomization and the particular fluid utilized in carrying out the atomization technique employed will not be critical in determining the effectiveness of the addition of a given level of lithium on the production of spherically shaped particles.

In carrying out the examples in the present invention, air atomization has been employed as being most typically utilized in commercial operations. However, the presently claimed method also finds utility using other atomizing media besides air.

EXAMPLES

General Comments

The nature of the present invention may be more clearly understood by recourse to the following examples which are set forth for illustrative purposes only and are not to be construed as limiting the invention thereto:

EXAMPLES I-V

In order to determine the relative effect upon the formation of spherically-shaped particles utilizing various levels of addition of lithium, a variety of commercial Special High Grade zinc materials were alloyed with various levels of lithium to give the compositions set forth in Table 1. The alloys were then air-atomized in accordance with the foregoing procedure. The resultant particle shape descriptions and physical properties are set forth in the attached Table 1.

Figure 2:
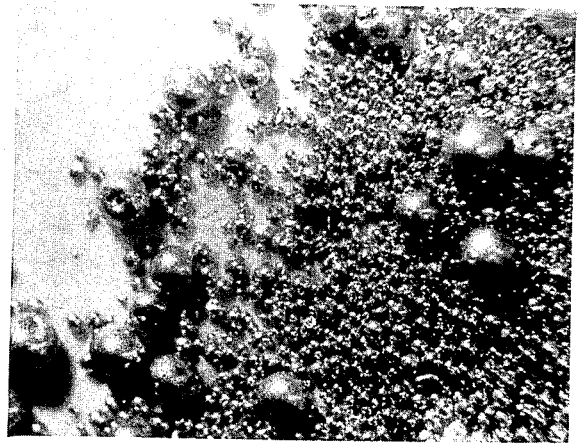
FIG. 2 is a photograph of air-atomized zinc-lithium powder, at a magnification of 13×, showing particles exhibiting a spherical shape over the entire size range.

These data show that adding 0.01% lithium (Example II) effects a coarse fraction (−20 +60 mesh) with all spherical particles and finer fractions with both spherical and irregular particles. At 0.028% lithium (Example IV), all fractions are entirely spherical. The difference between irregular and spherical shape effected by the lithium addition is illustrated in FIGS. 1 and 2. Spherically shaped zinc-lithium powders exhibit apparent densities significantly greater than 3.5 g/cc and flow rates much faster than irregular zinc powder (Example I)—see Table 1.

TABLE 1

EXAMPLES I-V

| | \multicolumn{5}{c}{EXAMPLES NOS.} | | | | |
|---|---|---|---|---|---|
| | I | II | III | IV | V |
| Chemical Composition, Wt. %: | | | | | |
| Li | 0 | 0.010 | 0.017 | 0.028 | 0.046 |
| Pb | 0.0013 | 0.0022 | 0.002 | 0.002 | 0.0015 |
| Cd | 0.0015 | 0.0023 | 0.0023 | 0.0014 | 0.0017 |
| Fe | 0.0020 | 0.0018 | 0.0028 | (0.019) | 0.0017 |
| Cu | 0.0036 | <0.001 | 0.0009 | 0.0009 | 0.0022 |
| Sn | 0.0006 | <0.0003 | <0.0003 | <0.0003 | <0.0003 |
| Physical Properties: | | | | | |
| Particle Shape, Tyler Mesh Size | | | | | |
| −20 +60 (−850 to 250μ) | Irregular | Spherical | Spherical | Spherical | Spherical |
| −60 +100 (−250 to 150μ) | Irregular | Spherical & Irregular | Spherical | Spherical | Spherical |
| −100 +200 (−150 to 75μ) | Irregular | Spherical & Irregular | Spherical | Spherical | Spherical |
| −200 +325 (−75 to 45μ) | Irregular | Spherical & Irregular | Spherical & Irregular | Spherical | Spherical |
| −325 (−45μ) | Irregular | Spherical & Irregular | Spherical & Irregular | Spherical | Spherical |
| Screen Analysis, Tyler Mesh Size | | | | | |
| On 20 | 0 | 0 | 0 | 0 | 0 |
| −20 +60 | 30.7 | 38.0 | 68.4 | 59.8 | 37.3 |
| −60 +100 | 32.3 | 28.0 | 19.9 | 23.8 | 28.7 |
| −100 +200 | 26.0 | 24.0 | 8.9 | 13.0 | 22.6 |
| −200 +325 | 7.2 | 7.0 | 1.9 | 2.3 | 7.3 |
| −325 | 3.8 | 3.0 | 0.9 | 0.8 | 4.2 |
| Flow, Secs./50 g | | | | | |
| Hall | None | 20.9 | None | 25.2 | 20.1 |
| Carney | 8.7 | 3.7 | 4.5 | 4.0 | 3.4 |
| Apparent Density, g/cc | | | | | |
| Hall | — | 3.97 | — | 4.27 | 4.20 |
| Carney | 2.85 | — | 3.89 | — | — |

EXAMPLES VI-VII

Zinc powders produced by the air atomization process have an irregular particle shape. These commercial zinc powders may or may not contain an intentional lead addition along with minor impurities such as Cd, Cu, Sn, Fe, Ni and In. The irregular zinc particle shape is not altered by the presence of any of these elements.

In order to determine the effectiveness of the addition of lithium to various commercial grades of zinc material having lead contents ranging up to 1.5 weight percent with varying levels of cadmium, iron, copper and tin, additional experimental data was obtained utilizing zinc materials which contained or to which has been added substantial quantities of lead. These materials were atomized in accordance with the foregoing procedure in substantially the same manner as Examples I-V. Attached Table 2 presents data showing the compositions of the materials as well as the physical properties, including a determination of particle shape for various mesh sizes, flow characteristics and apparent densities.

These data illustrate that the use of a lithium addition will result in the production of spherically shaped particles having advantageous flow and apparent density characteristics even for compositions having relatively high lead contents.

TABLE 2

EXAMPLES VI-VII

| | \multicolumn{2}{c}{EXAMPLES NOS.} | |
|---|---|---|
| | VI | VII |
| Chemical Composition, Wt. %: | | |
| Li | 0.034 | 0.041 |
| Pb | 1.3 | 1.5 |
| Cd | 0.0022 | 0.0002 |
| Fe | 0.0163 | 0.0006 |
| Cu | 0.0123 | 0.0006 |
| Sn | 0.0151 | <0.0005 |
| Physical Properties: | | |
| Particle Shape, Tyler Mesh Size | | |
| −20 +60 (−850 to 250μ) | Spherical | Spherical |
| −60 +100 (−250 to 150μ) | Spherical | Spherical |
| −100 +200 (−150 to 75μ) | Spherical | Spherical |
| −200 +325 (−75 to 45μ) | Spherical | Spherical |
| −325 (−45μ) | Spherical | Spherical |
| Screen Analysis, Tyler Mesh Size | | |
| On 20 | 0 | 0 |
| −20 +60 | 33.6 | 34.0 |
| −60 +100 | 32.2 | 30.7 |
| −100 +200 | 24.5 | 26.6 |
| −200 +325 | 6.1 | 6.4 |
| −325 | 3.6 | 2.3 |
| Flow, Secs./50 g | | |
| Hall | 19.4 | 18.4 |
| Carney | — | — |
| Apparent Density, g/cc | | |
| Hall | 4.21 | 4.24 |
| Carney | — | — |

EXAMPLES VIII–XXVII

There are several potential advantages with the utilization of spherical zinc powder in primary alkaline batteries. The greater apparent densities achievable with spherical powders means that more powder can be packed per unit volume. Thus, for a given cell size, spherical zinc will provide a longer service life, or for the same cell life, spherical powder will permit a smaller cell size. Spherical powders will effect a more uniform distribution of porosity in the zinc anode of the cell and, therefore, a more uniform distribution of alkaline electrolyte and corrosion products formed in the cell reaction. The net result is improved battery performance. A further advantage is that from a manufacturing standpoint, the spherical zinc powder will improve the production rate because of the faster filling rate.

Commercial irregular zinc powders for use in the alkaline battery industry are made with Special High Grade zinc, both with and without the addition of lead. When lead is added, normal quantities are in the range of from 0.04–0.055 weight percent. It is known that lead significantly reduces the hydrogen gassing of the zinc powder, a highly desirable characteristic for alkaline batteries. In a potassium hydroxide solution, typical hydrogen gassing values are:

| POWDER | GASSING cc of $H_2$ at 93° C. - 24 hours |
|---|---|
| Special High Grade Zinc Powder (NJZ Z.P.-1211) | 8.5 |
| Special High Grade Zinc Powder with 0.040–0.055 weight percent Lead | 0.42 |
| (NJZ Z.P.-1202) | |

In order to determine the effect of lithium and lead concentrations on the gassing characteristics of spherical zinc powders, a number of zinc-lithium and zinc-lithium-lead compositions were prepared and air-atomized in accordance with the procedure set out hereinabove.

It is also thought that there is potential for the use of zinc-lead-indium powder compositions in alkaline batteries. Zinc-lithium lead-indium alloy compositions were made and air-atomized into powders to determine if the addition of lithium yields spherical particles.

Spherical zinc-lithium powders have been found to display gassing characteristics in potassium hydroxide solutions of the type used in primary alkaline batteries similar to irregular, unalloyed zinc powders. Spherical zinc-lithium-lead and zinc-lithium-lead-indium powders have been found to possess gassing characteristics similar to irregular zinc-0.050 lead powders which are now employed commercially in primary alkaline batteries. The compositions of the binary zinc-lithium and ternary zinc-lithium-lead powders investigated and their gassing characteristics are given in Table 3 along with their physical properties. Similar data for the quaternary zinc-lithium-lead-indium powders are presented in Table 4. The gassing behavior was evaluated using a potassium hydroxide solution containing two weight percent zinc oxide and having a specific gravity of 1.37. Gassing tests were conducted on a two-gram powder sample at 93° C. for 24 hours.

TABLE 3

| EXAMPLES VIII–XXIII | | | | | | | | |
|---|---|---|---|---|---|---|---|---|
| | VIII | XIX | X | XI | XII | XIII | XIV | XV |
| Chemical Composition, wt. % | | | | | | | | |
| Li | 0.010 | 0.017 | 0.028 | 0.046 | 0.016 | 0.020 | 0.032 | 0.026 |
| Pb | 0.0022 | 0.002 | 0.002 | 0.0015 | 0.044 | 0.068 | 0.092 | 0.10 |
| Cd | 0.0023 | 0.0023 | 0.0014 | 0.0017 | 0.0021 | 0.0023 | 0.0020 | 0.0001 |
| Fe | 0.0018 | 0.0028 | (0.019) | 0.0017 | 0.0006 | 0.0003 | 0.0005 | 0.0004 |
| Cu | <0.001 | 0.0009 | 0.0004 | 0.0009 | 0.0022 | 0.0010 | 0.0012 | 0.0002 |
| Sn | <0.0003 | <0.0003 | <0.0003 | <0.0003 | <0.0005 | <0.0005 | <0.0005 | <0.0005 |
| Particle Shape (Sp = Spherical) (Ir = Irregular) | Sp + Ir | Sp + Ir | Sp | Sp | Sp + Ir | Sp | Sp | Sp |
| Screen Analysis, Tyler Mesh Size | | | | | | | | |
| On 20 | 0 | 0 | 0 | 0 | 0 | 0 | 0 | 0 |
| −20 +60 | 38.0 | 68.4 | 59.8 | 37.3 | 36.7 | 45.43 | 34.4 | 32.1 |
| −60 +100 | 28.0 | 19.9 | 23.8 | 28.7 | 37.9 | 36.4 | 37.2 | 37.4 |
| −100 +200 | 24.0 | 8.9 | 13.0 | 22.6 | 24.2 | 17.9 | 27.4 | 27.1 |
| −200 +325 | 7.0 | 1.9 | 2.3 | 7.3 | 1.1 | 0.3 | 1.0 | 2.5 |
| −325 | 3.0 | 0.9 | 0.8 | 4.2 | 0.1 | 0.1 | 0.1 | 0.4 |
| Flow, Secs/50 g | | | | | | | | |
| Hall | 20.9 | None | 25.2 | 20.1 | 21.0 | 28.2 | 22.2 | 19.7 |
| Carney | 3.7 | 4.5 | 4.0 | 3.4 | 3.6 | 4.1 | 3.6 | — |
| Apparent Density, g/cc | | | | | | | | |
| Hall | 3.97 | — | 4.27 | 4.20 | 4.07 | 3.98 | 4.12 | 4.18 |
| Carney | — | 3.89 | — | — | — | — | — | — |
| Gassing, cc of $H_2$ at 93° C. - 24 Hrs. | 7.7 | 7.7 | 8.3* | 8.0 | 2.5* | 2.2** | 0.67* | 0.27* |

| | XVI | XVII | XVIII | XIX | XX | XXI | XXII | XXIII |
|---|---|---|---|---|---|---|---|---|
| Chemical Composition, wt. % | | | | | | | | |
| Li | 0.032 | 0.042 | 0.051 | 0.022 | 0.028 | 0.042 | 0.034 | 0.041 |
| Pb | 0.12 | 0.11 | 0.27 | 0.29 | 0.48 | 1.0 | 1.3 | 1.5 |

TABLE 3-continued

| EXAMPLES VIII–XXIII | | | | | | | | |
|---|---|---|---|---|---|---|---|---|
| Cd | 0.0002 | 0.0002 | 0.0001 | 0.0001 | 0.0001 | 0.0003 | 0.0022 | 0.0002 |
| Fe | 0.0007 | 0.0004 | 0.0014 | 0.0003 | 0.0003 | 0.0004 | 0.0163 | 0.0006 |
| Cu | 0.0005 | 0.0018 | 0.0010 | 0.0010 | 0.0003 | 0.0004 | 0.0123 | 0.0006 |
| Sn | <0.0005 | <0.0005 | <0.0005 | <0.0005 | <0.0005 | <0.0005 | <0.0151 | <0.0005 |
| Particle Shape | Sp | Sp | Sp | Sp | Sp | Sp | Sp | Sp |
| (Sp = Spherical) | | | | | | | | |
| (Ir = Irregular) | | | | | | | | |
| Screen Analysis, | | | | | | | | |
| Tyler Mesh Size | | | | | | | | |
| On 20 | — | — | 0 | 0 | 0 | 0 | 0 | 0 |
| −20 +60 | — | — | 41.8 | 30.3 | 22.0 | 10.9 | 33.6 | 34.0 |
| −60 +100 | — | — | 34.5 | 32.7 | 30.5 | 27.3 | 32.2 | 30.7 |
| −100 +200 | — | — | 21.4 | 25.8 | 30.7 | 37.7 | 24.5 | 26.6 |
| −200 +325 | — | — | 1.8 | 7.0 | 10.3 | 14.3 | 6.1 | 6.4 |
| −325 | — | — | 0.5 | 4.2 | 6.5 | 9.8 | 3.6 | 2.3 |
| Flow, Secs/50 g | | | | | | | | |
| Hall | — | — | 19.9 | 18.5 | 18.0 | 17.1 | 19.4 | 18.4 |
| Carney | — | — | — | — | — | — | — | — |
| Apparent Density, g/cc | | | | | | | | |
| Hall | — | — | 4.26 | 4.22 | 4.20 | 4.24 | 4.21 | 4.24 |
| Carney | — | — | — | — | — | — | — | — |
| Gassing, cc of $H_2$ at 93° C. - 24 Hrs. | 0.45 | 0.30 | 0.12* | 0.26* | 0.34** | 0.25* | 7.8* | 0.47* |

*Average of Three Determinations
**Average of Four Determinations

TABLE 4

| EXAMPLES XXIV–XXVII | | | | |
|---|---|---|---|---|
| | XXIV | XXV | XXVI | XXVII |
| Chemical Composition, Wt. % | | | | |
| Li | 0.028 | 0.035 | 0.037 | 0.034 |
| Pb | 0.1466 | 0.1310 | 0.1230 | 0.1193 |
| In | 0.0008 | 0.0049 | 0.018 | 0.126 |
| Cd | 0.0001 | 0.0001 | 0.0001 | 0.0001 |
| Fe | 0.0005 | 0.0004 | 0.0005 | 0.0004 |
| Cu | 0.0001 | 0.0001 | 0.0001 | 0.0001 |
| Particle Shape (Sp = Spherical) | Sp | Sp | Sp | Sp |
| Screen Analysis Tyler Mesh size | | | | |
| On 20 | 0.0 | 0.0 | 0.0 | 0.0 |
| −20 +60 | 23.6 | 12.8 | 27.9 | 23.6 |
| −60 +100 | 28.5 | 27.5 | 30.6 | 31.2 |
| −100 +200 | 28.9 | 33.4 | 24.8 | 26.8 |
| −200 +325 | 11.3 | 14.0 | 9.3 | 10.1 |
| −325 | 7.7 | 12.3 | 7.4 | 8.3 |
| Flow, Secs./50 g Hall | 20 | 17.5 | 21.6 | 17.3 |
| Apparent Density, g/cc Hall | 4.12 | 4.20 | 4.25 | 4.25 |
| Gassing, cc of $H_2$ at 93° C. - 24 hrs. | 0.69* | 0.70* | 0.73* | 0.50* |

*Average of Two Determinations

As shown by the results for the ternary zinc-lithium-lead powders given in Table 3, gassing decreases with increasing lead content up to approximately 0.10%. Thereafter, the gassing remains fairly constant up to the highest lead level evaluated: 1.5%. The data show that a higher minimum lead content is required in spherical zinc-lithium powder than in irregular zinc powder to obtain low gassing.

As is the case with the commercial, irregular zinc-lead powders for alkaline batteries, the gassing of spherical zinc-lithium-lead powders is dependent on the impurities present as illustrated by Example XXII which contains significant quantities of iron, copper and tin. Special High Grade zinc is required in the production of zinc-lithium-lead powders to obtain low gassing. The gassing data for the nominal 0.1 and 0.3% lead containing zinc-lithium-lead powders demonstrate that the lithium content can be varied significantly with no adverse influence on gassing (Examples XV to XVII and XVIII to XIX).

The results for the zinc-lithium-lead-indium powders, Examples XXIV–XXVII in Table 4, show that for indium contents up to 0.126 weight percent, the powders possess a spherical shape. All the spherical indium-containing powders display low gassing characteristics that are comparable with the spherical zinc-lithium-lead and irregular zinc-lead powders.

While the invention has been described with reference to a number of embodiments, it will be apparent to one skilled in the art that there are numerous additional variations which properly fall within the range of this invention. Therefore, it should be understood that the foregoing embodiments and examples are set forth to illustrate the advantages which would be achieved utilizing the present invention and should not be interpreted as limiting the scope of the invention.

I claim:

1. A method for the production of spherically shaped zinc powders using an air-atomization process, comprising forming a molten zinc-lithium alloy and subsequently atomizing the molten zinc-lithium alloy.

2. A method according to claim 1 wherein the lithium is added in an amount of from about 0.01 weight percent based upon the total weight of the zinc alloy.

3. A method according to claim 1 wherein the lithium is added in an amount of from about 0.01 to about 0.1 weight percent based upon the total weight of the zinc alloy.

4. A method according to claim 1 wherein the lithium is added in an amount of from about 0.01 to 0.05 weight percent based upon the total weight of the zinc alloy.

5. A method according to claim 1 for the production of spherically shaped zinc powders which also contain substantial quantities of lead in order to affect the production of a spherically-shaped zinc-lead-lithium alloy powder having low gassing characteristics.

6. A method according to claim 5 wherein the lead portion of the alloy is present in an amount from about 0.04 weight percent based upon the total weight of the zinc composition.

7. A method according to claim 5 wherein the lead portion of the alloy is present in an amount from about 0.1 to about 1.5 weight percent based upon the total weight of the zinc composition.

8. A method according to claim 5 wherein the lead portion of the alloy is present in an amount from about 0.1 to about 0.5 weight percent based upon the total weight of the zinc composition.

9. A method according to claim 5 wherein the lithium is added in an amount of from about 0.01 weight percent based upon the total weight of the zinc alloy.

10. A method according to claim 5 wherein the lithium is added in an amount of from about 0.01 to about 0.1 weight percent based upon the total weight of the zinc composition.

11. A method according to claim 5 wherein the lithium is added in an amount of from about 0.01 to 0.05 weight percent based upon the total weight of the zinc composition.

12. A method according to claim 5 for the production of spherically shaped zinc powders which also contain substantial quantities of indium in order to affect the production of a spherically-shaped zinc-lithium-lead-indium alloy powder having low gassing characteristics.

13. A method according to claim 12 wherein the indium portion of the alloy is present in an amount from about 0.0008 weight percent based upon the total weight of the zinc composition.

14. A method according to claim 12 wherein the indium portion of the alloy is present in an amount from about 0.0008 to about 0.126 weight percent based upon the total weight of the zinc composition.

* * * * *

UNITED STATES PATENT AND TRADEMARK OFFICE
CERTIFICATE OF CORRECTION

PATENT NO. : 4,606,869
DATED : August 19, 1986
INVENTOR(S) : Walter Showak

It is certified that error appears in the above-identified patent and that said Letters Patent is hereby corrected as shown below:

Column 1, line 35, "apparent range" should read -- apparent density range --.

Signed and Sealed this

Ninth Day of December, 1986

Attest:

DONALD J. QUIGG

*Attesting Officer*  *Commissioner of Patents and Trademarks*